Dec. 5, 1967  G. A. POTEAT  3,356,309
MOUNTING CORE
Filed April 22, 1966
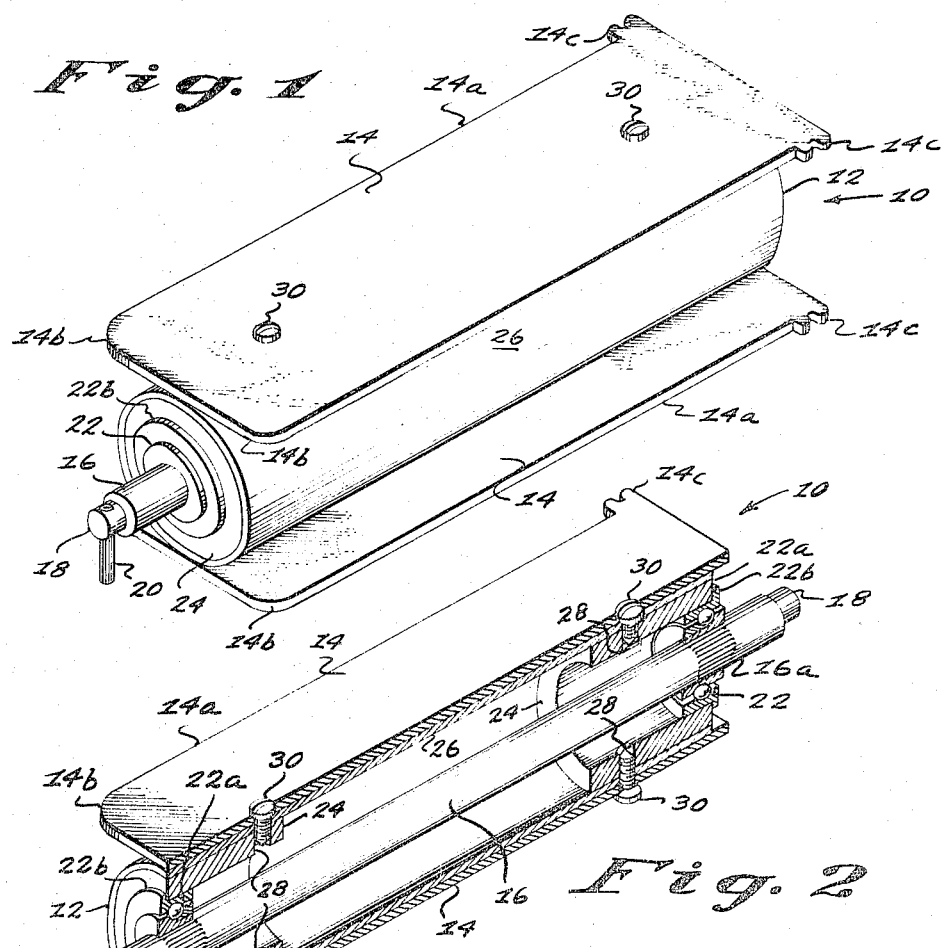
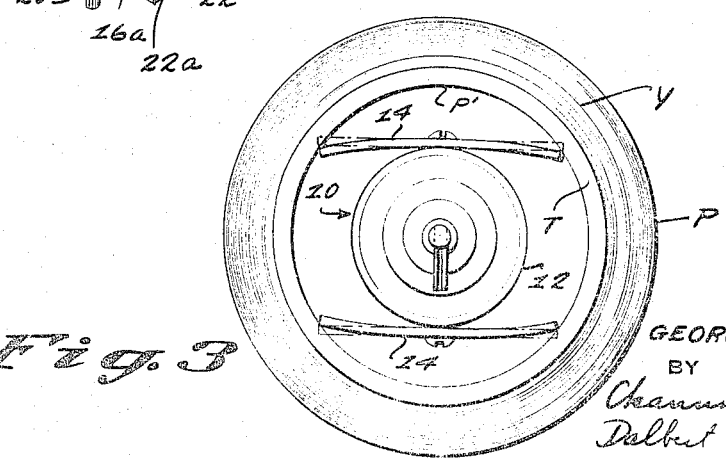
INVENTOR
GEORGE A. POTEAT
BY
Channing P. Richards &
Dalbert U. Shefte
ATTORNEYS

United States Patent Office 3,356,309
Patented Dec. 5, 1967

3,356,309
MOUNTING CORE
George A. Poteat, Greensboro, N.C., assignor to Engineered Plastics, Incorporated, Gibsonville, N.C., a corporation of Delaware
Filed Apr. 22, 1966, Ser. No. 544,523
9 Claims. (Cl. 242—46.6)

ABSTRACT OF THE DISCLOSURE

A mounting core having a central body portion and a plurality of flange portions secured intermediate their ends to and extending from the central body portion in oblique relation to the interior surface of a hollow object to be supported on the core with the flange portions having outer object engaging edges disposed lengthwise with respect to the object, and the flange portions being resilient for arcuate flexing to fit objects of different or distorted interior dimensions.

---

The present invention relates to a mounting core for supporting hollow objects, and more particularly to a mounting core that provides firm support for hollow objects and that has a relatively wide core size tolerance such that it will effectively support objects of different or distorted interior dimensions.

Briefly described, the mounting core of the present invention has a central body portion to which is secured a plurality of offset flange portions that extend from the body portion in oblique relation to the interior surface of the hollow object in which the core is inserted. The flange portions are resilient to provide firm support of the object through the oblique engagement therewith while permitting arcuate flexing of the flange portions obliquely with respect to the object interior for reduction of the effective core size to fit objects having different or distorted interior dimensions.

The oblique disposition and resilient character of the flange portions function to provide firm support of an object even when the flange portions have been flexed considerably to fit a relatively small or distorted object interior and will maintain the firm support when the interior size of an object changes during support, as when it shrinks during a processing procedure.

The flange portions may be secured tangentially to the body portion to provide a pronounced obliqueness to the object interior and an extending length for flexing such that firm support can be obtained over a considerable range of core size variation. Further, the flange portions may be arranged in pairs with the flange portions of each pair disposed in opposed relation for opposite arcuate flexing to provide balanced support of an object thereon.

The foregoing features are contained in the preferred embodiment, in which the body portion is cylindrical and the flange portions are in the form of a pair of parallel flat plates intermediately secured tangentially to the cylindrical body portion in opposed spaced relation. Each of the flat plates extends in opposite directions from the intermediate securement to the body portion for opposed engagement with the interior surface of an object in which the core is inserted. The spaced parallel plates are symmetrically disposed for symmetrically opposed oblique supporting engagement with the object interior, and they are resilient to provide firm support while permitting arcuate flexing of the plates toward each other and obliquely with respect to the object interior for reduction of the effective size of the core to fit objects having different or distorted interior dimensions.

The tangential securement of the flat plates to the cylindrical body portion and the extension of each plate from the body portion in opposite directions for opposed object engagement results in the full extent of the plates being efficiently utilized for flexing and results in balanced flexing of the plates against the body portion such that proper support and flexing of the plates are obtained such that only a simple attachment of the plates to the body portion is necessary. As a consequence, the plates may be secured to the body portion in a manner permitting easy removal for replacement when worn or when a different size core is desired. Also, removal permits the plates to be reversed when they have become deformed from use, thereby extending the life of the plates considerably.

The features and advantages of the present invention are inherent in the preferred embodiment that is described in detail hereinbelow and illustrated in the accompanying drawings, in which:

FIG. 1 is a perspective view of a mounting core according to the preferred embodiment of the present invention;

FIG. 2 is a sectional perspective view of the mounting core of FIG. 1; and

FIG. 3 is an end view of the mounting core of FIG. 1 as viewed from the left in FIG. 1 and showing the mounting core inserted in supporting relation in a textile yarn package.

The mounting core 10 of the illustrated preferred embodiment of the present invention is particularly adapted to support a tubular yarn package P from which yarn Y is withdrawn in a winding operation or other operation in which the yarn is pulled from the package with the package being free to rotate to permit yarn withdrawal. In such a package P the yarn Y is wound on a paperboard tube T in which the mounting core 10 is inserted for support of the package.

The mounting core 10 consists generally of a cylindrical body portion 12 and a pair of flange portions in the form of flat flange plates 14 secured to the body portion 12 in diametrically opposed relation with each plate 14 having opposed outer edges 14a for supporting engagement of the package interior P'. Thus, the outer edges 14a define the effective core size of the mounting core 10.

The cylindrical body portion 12 is compositely formed, having an axial mandrel shaft 16 formed at its ends 18 for fitting the particular apparatus on which the mounting core 10 is to be mounted. In the embodiment illustrated a radial pin 20 is inserted in one of the mandrel shaft ends 18 for keying the mounting core 10 to the apparatus. Adjacent each end 18 the mandrel shaft 16 is scored as indicated at 16a to form spaced seats for a pair of annular ball bearing units 22 that have cylindrical exterior surfaces 22a from the outer ends of which extend annular flanges 22b.

A pair of spaced tubular body members 24 are seated on the exterior cylindrical surfaces 22a of the ball bearing units 22 in abutment against the bearing flanges 22b. These tubular body members 24 are of sufficient weight to provide stabilization of the mounting core 10 and supported package P during rotation, and they extend axially inward from the bearing units 22 sufficiently to provide an adequate base for attachment of the flange plates 14 to the cylindrical body portion 12. The size and weight of these body members 24 may be varied as desired to provide advantageous balancing or weighting of the mounting core 10.

Mounted on the tubular body members 24 is a cylindrical sheath 26 that extends between and in covering relation over the body members 24 to provide a cylindrical surface for support of the flange plates 14. For flange attachment two pairs of radial holes are drilled through the sheath 26 and body members 24 with the holes of each pair being axially aligned and the holes of one pair being diametrically opposed to the holes of the other pair (FIG. 2).

The aforementioned flat flange plates 14 are attached intermediate their outer edges 14a to the cylindrical body portion 12 in tangential relation thereto by screws 30 that extend through the flange plates 14 and are threadably secured in the aforementioned holes 28 of the body portion sheath 26 and body members 24.

The outer edges 14a of each flat flange plate 14 are equally spaced from the tangential body portion securement and extend parallel thereto for lengthwise engagement with the interior package surface P' and the plates are spaced apart by the diametrical extent of the body portion 12 with the diametrical opposition of the attaching holes 28 disposing the plates in parallel relation.

As a result of this arrangement the flat flange plates 14 are symmetrically opposed and each extends as a chord across the interior of the package P and engages the interior package surface P' obliquely.

The flat flange plates 14 are formed of a resilient material such as nylon and are sufficiently thick to provide firm supporting engagement of the package P while being flexible to vary the effective core size by arcuate flexing about the tangential body portion securement. The tangential securement results in the full width of the plates being available for arcuate flexing and provides a maximum extent of the plates from the body portion 12 to the package P as well as a maximum obliqueness of package engagement, all of which contribute to permit a substantial range of flexing while maintaining firm package support, and the support is balanced by the opposing relation of the flat plates.

Also, the tangential securement and the opposite oblique package engagement by the outer opposed edges 14a of each plate eliminates the need for a rigid and tight attachment of the plates 14 to the body portion 12 as the plate is symmetrically flexed about the body portion as a fulcrum when the mounting core 10 is inserted in a package as shown in FIG. 3. The dash lines in FIG. 3 show the flat position of the flange plates prior to insertion in a package.

The outer edges 14a of the flange plates 14 are tapered at one end 14b to facilitate insertion of the mounting core 10 in a package P, particularly where the package interior surface P' is considerably undersize. The outer flange edges 14a are further formed with outwardly extending projections 14c at the ends opposite the tapered ends 14b for seating of the package P thereagainst in proper position, and these projections 14c may be grooved as shown for winding of the inner end of the yarn thereon so that the yarn end will be available for tieing to the outer end of the yarn of a succeeding package.

The simple screw attachment of the flange plates 14 to the body portion 12 facilitates detachment of the plates for replacement, as when the plates are worn, or when different size plates are to be attached to change the core size without discarding the relatively expensive body portion. Also, this permits the plates to be reversed for continued use after they have become arcuately deformed.

As can be seen from FIG. 3, the mounting core 10 will fit a wide range of core size variations, which variations are common in yarn packages. Variations greater than that illustrated can be accommodated as can corrugations and other deformations. Also, changes in size of the object during the time it is being supported can be accommodated as when a yarn package shrinks after dyeing or other wet treatment.

The above-described body portion 12 may be varied considerably without deviating from the present invention. Thus, a non-rotating structure could be used and various constructions and sizes would be feasible depending on the intended purpose. Similarly, variations in the flange structure can be made within the scope of the present invention. Further, the entire core mounting could be made as an integral structure, as by extrusion molding.

Where relatively large core sizes are needed, a mounting core such as that illustrated can serve as an interior body portion for telescoping within a large outer cylindrical sheath to the outer surface of which large flange plates are secured, thus making use of an available small size core mounting in the formation of a large size mounting.

Further, where the diameter of the cylindrical body portion 12 is more nearly the same as the diameter of the package interior P' than in the illustrated embodiment, two or more pairs of flange plates 14 may be employed effectively for the same object-supporting advantage as the single pair of the illustrated embodiment.

Various attachments could also be added, such as a draw-off cap for yarn handling, which could be attached to the end of the body portion 12 for extension beyond the circumference of the yarn package P.

It is to be understood that the foregoing detailed description has been set out for purposes of illustration only and that the present invention is not to be limited thereby or otherwise, except as defined in the appended claims.

I claim:
1. A mounting core for supporting hollow objects comprising a central body portion, and a plurality of flange portions secured to said central body portion and extending therefrom for oblique engagement with the interior surface of a hollow object in which said core is inserted, said flange portions having outer edges disposed for lengthwise engagement with said object, said flange portions being resilient to provide firm support of an object while permitting arcuate flexing of the flange portions obliquely with respect to the interior surface of the object for reduction of the effective core size to fit objects of different or distorted interior dimensions, each said flange portion being secured intermediately to said central body portion and extending oppositely therefrom for opposite oblique engagement of the object interior.

2. A mounting core for supporting hollow objects according to claim 1 and characterized further in that there are two said flange portions secured to said central body portion in opposed symmetrical relation for opposed arcuate flexing to provide balanced support of the hollow object on said core.

3. A mounting core for supporting hollow objects according to claim 1 and characterized further in that each said flange portion is flat and is secured intermediately to said central body portion at a tangent thereto and extends oppositely therefrom for opposite oblique engagement of the object interior.

4. A mounting core for supporting hollow objects according to claim 3 and characterized further in that there are two said flat flange portions secured to said central body portion in opposed parallel relation for opposed arcuate flexing to provide balanced support of the hollow object on said core.

5. A mounting core for supporting hollow objects comprising a cylindrical body portion, and a pair of parallel flat plates intermediately secured tangentially to said cylindrical body portion in opposed spaced relation, each of said flat plates extending in opposite directions from said body portion for opposed engagement with the interior surface of an object in which the core is inserted, said spaced parallel plates being symmetrically disposed for symmetrically opposed oblique supporting engagement with the object interior and being resilient to provide firm support while permitting arcuate flexing of the plates toward each other and obliquely with respect to the interior surface of the hollow object for reduction of the effective core size to fit objects of different or distorted interior dimensions.

6. A mounting core for supporting hollow objects according to claim 5 and characterized further in that said flat plates have exteriorly extending end projections for seating of the end of the supported object thereagainst to position the object on said core.

7. A mounting core for supporting hollow objects according to claim 5 and characterized further in that said flat plates are reversibly secured to said cylindrical body portion to permit arcuately deformed plates to be inverted for continued use.

8. A mounting core for supporting hollow objects according to claim 5 and characterized further in that said flat plates are replaceably secured to said cylindrical body portion to permit different size plates to be secured to said body portion for support of different size objects.

9. A mounting core for supporting hollow objects comprising a central body portion, and a plurality of flange portions secured to said central body portion and extending therefrom for oblique engagement with the interior surface of a hollow object in which said core is inserted, said flange portions having outer edges disposed for lengthwise engagement with said object, said flange portions being resilient to provide firm support of an object while permitting arcuate flexing of the flange portions obliquely with respect to the interior surface of the object for reduction of the effective core size to fit objects of different or distorted interior dimensions, said flange portions being arranged in pairs with said flange portions of each pair disposed in opposed relation outwardly of said central body portion for opposite arcuate flexing toward each other to provide balanced support of the hollow object on said core.

References Cited

UNITED STATES PATENTS

| | | | |
|---|---|---|---|
| 1,261,356 | 4/1918 | Brown | 242—46.3 |
| 2,956,757 | 10/1960 | Limbach | 242—46.3 |
| 3,093,332 | 6/1963 | Jackson | 242—46.6 |
| 3,285,528 | 11/1966 | Beindorf | 242—46.4 X |

OTHER REFERENCES

Purcell, J. H.: Spooling Adapter, IBM, Technical Disclosure Bulletin, vol. 8, No. 8, January 1966, p. 1124.

STANLEY N. GILREATH, *Primary Examiner.*